United States Patent [19]

Kelley

[11] 4,186,832

[45] Feb. 5, 1980

[54] CONVEYOR FOR HANDLING FREE-FLOWING MATERIAL

[76] Inventor: Hugh D. Kelley, 1451 Morgantown, Wichita, Kans. 67212

[21] Appl. No.: 934,896

[22] Filed: Aug. 18, 1978

[51] Int. Cl.² .................................................. B65G 21/20
[52] U.S. Cl. .................................... 198/861; 198/657; 198/721; 198/735
[58] Field of Search ............... 198/616, 657, 717, 721, 198/727, 735, 841, 860, 861, 957; 193/2 R, 2 A, 3, 4, 5, 25 R, 25 A, 38; 308/238

[56] References Cited

U.S. PATENT DOCUMENTS

| | | | |
|---|---|---|---|
| 2,866,538 | 12/1958 | Goldberg | 198/841 |
| 3,099,494 | 7/1963 | Heinze | 193/25 R X |
| 3,111,216 | 11/1963 | Geberin | 198/727 |
| 3,889,791 | 6/1975 | Legille et al. | 193/3 |
| 4,068,755 | 1/1978 | Parkes et al. | 198/841 X |

FOREIGN PATENT DOCUMENTS 467710  6/1937  United Kingdom ..................... 198/735

*Primary Examiner*—James L. Rowland
*Attorney, Agent, or Firm*—Edwin H. Crabtree

[57] ABSTRACT

An improved conveyor for handling free-flowing material wherein the conveyor includes an endless chain with flights thereon or a screw. The conveyor having a metal round bottom trough receiving a "U" shaped liner contoured to fit on top of the trough. A plurality of resilient pressure blocks butting against the edges of the liner to allow the liner to contract and expand transverse to the length of the liner on top of the trough without causing the liner to buckle or become distorted. The liner is replaceable and greatly increases the wear life of the trough. The liner also reduces drag and wear of the flights or screw and reduces the horsepower requirements in the conveying of the free-flowing material.

7 Claims, 5 Drawing Figures

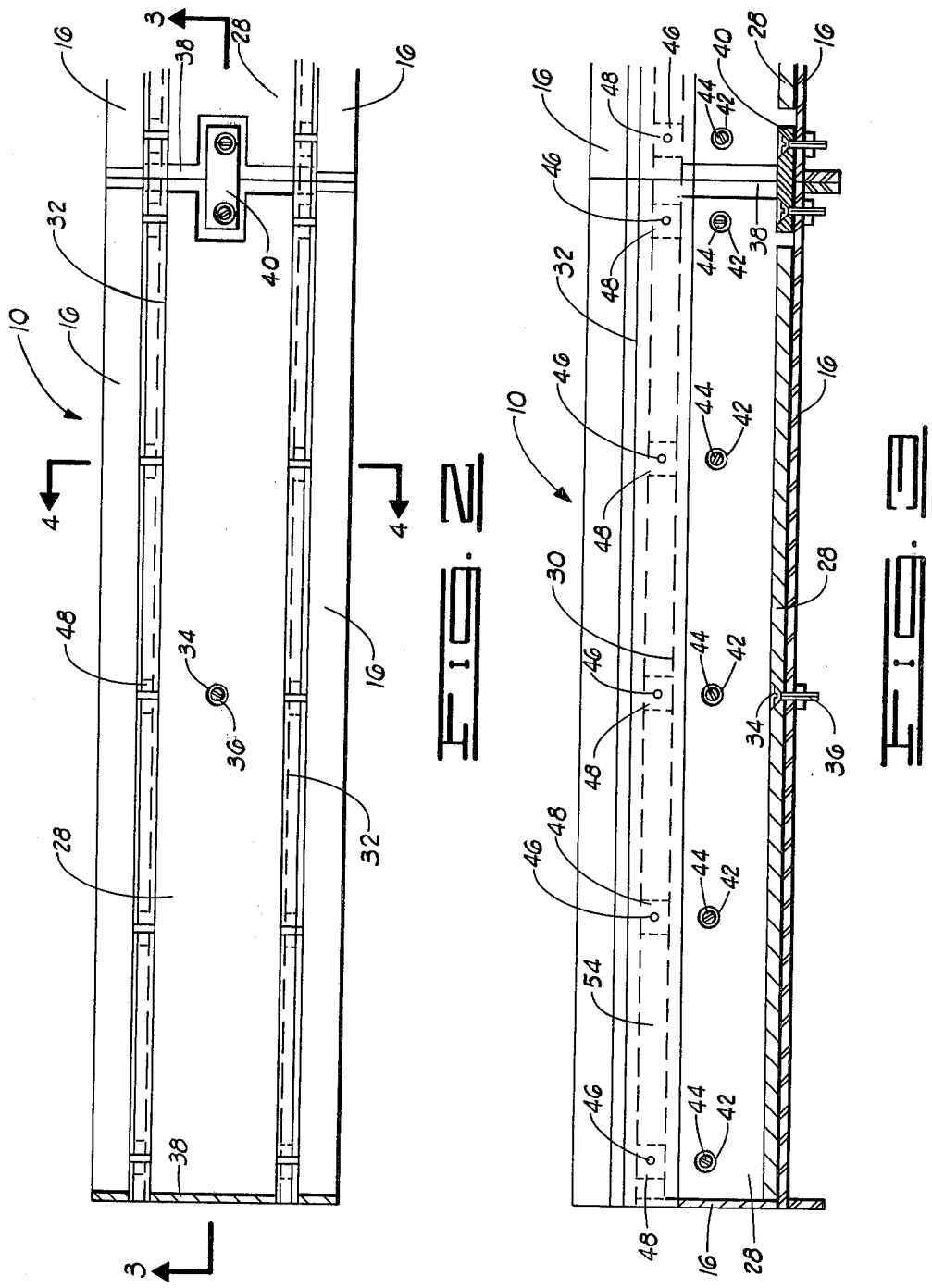

CONVEYOR FOR HANDLING FREE-FLOWING MATERIAL

BACKGROUND OF THE INVENTION

The subject invention relates generally to a round bottom conveyor and more particularly, but not by way of limitation, to a round bottom cnveyor having a "U" shaped liner mounted thereon for increasing the wear life of the conveyor.

Heretofore, there have been various types of material handling conveyors and transfer systems using round bottom conveyors having an endless chain with flights mounted thereon or auger type screws for moving the free-flowing material along the bottom of the trough. These conveyors have used metal liners and other types of material to reduce wear on the bottom of the trough. Also recently conveyor manufacturers have used flights made of ultrahigh molecular weight polymers or commonly called UHMW polyethylene lining material. These flights reduce wear and drag on the trough. The UHMW lining material has been tried in the bottom of round bottom trough conveyors with little success since prior to the subject invention no means has been provided to allow for expansion and contraction of the UHMW lining material The UHMW lining material offers approximately seven times increased wear life when compared to standard sheet steel material used in the trough housing. However, the inherent problem with the UHMW liner material is that it expands and contracts with changes in the ambient temperature approximately ten times more than the standard sheet steel material. This problem of expansion and contraction of the trough liner material is solved by the subject invention.

SUMMARY OF THE INVENTION

The subject invention provides a "U" shaped liner which is replaceably mounted in a round bottom trough for greatly increasing the wear life of a conveyor and reducing drag on the endless chain and flights or screw used in conveying free-flowing material in the conveyor.

The invention allows the liner to expand and contract with the change in ambient temperatures so that the liner does not buckle or become distorted when attached to the round bottom trough.

The liner material is made of UHMW polyethylene which when compared to metal lining material eliminates potential sparks from metal to metal contact which could cause fire or explosion. Also the UHMW material reduces noise normally caused by the flights or screw dragging on the bottom of the metal trough housing.

The liner material because it reduces drag on the flights or screw, reduces horsepower requirements in driving the endless chain with the flights or the screw, thereby improving the efficiency of the conveyor.

The improved conveyor for handling free-flowing material and having a trough for receiving an endless chain with flights or a screw therein, includes a "U" shaped liner contoured to fit on top of the round bottom trough and extending along the length thereof. The liner is attached to the sides of the trough by pressure blocks disposed adjacent the edges of the liner and secured to the trough. The pressure blocks allow the liner to expand and contract on top of the trough. The pressure blocks are held in place by an elongated seal retainer which extends along the sides and the length of the trough. A rubber seal also extends along the length of the trough and is attached to the sides of the trough for preventing the free-flowing material from falling between the sides of the metal trough and the liner.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 2 is a top view of the conveyor with the endless chain and flights removed.

FIG. 3 is a side sectional view of the round bottom conveyor taken along lines 3—3 shown in FIG. 2.

DETAILED DESCRIPTION OF THE DRAWINGS

Figure 1:
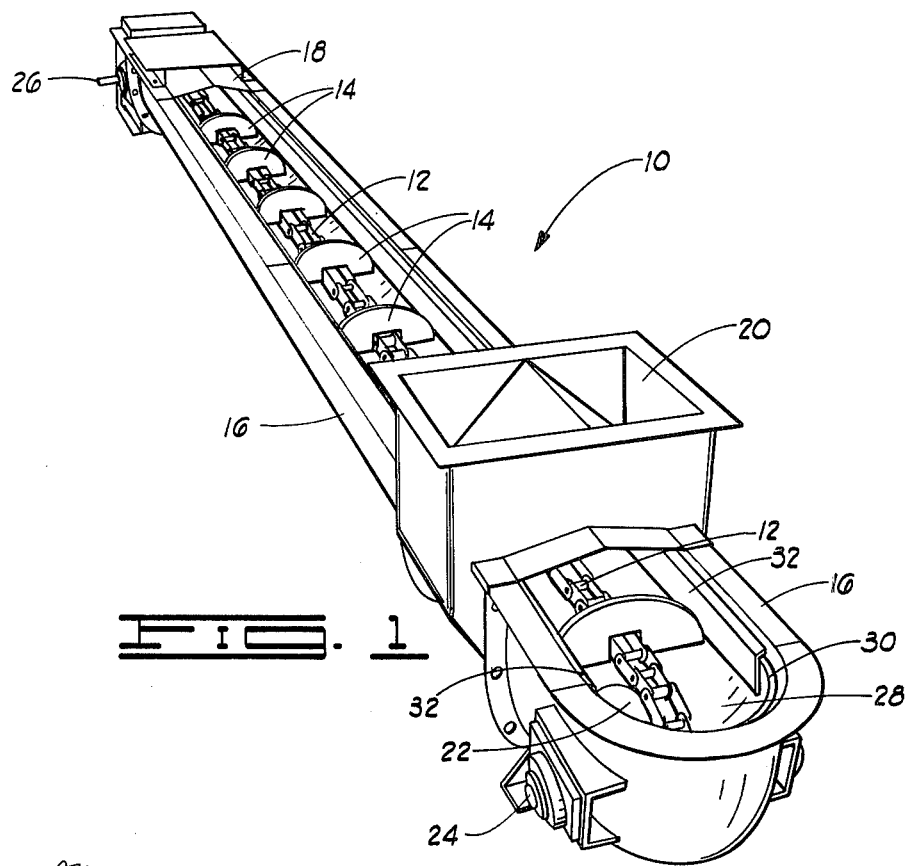
FIG. 1 is a perspective view of a round bottom conveyor having an endless chain with flights mounted thereon with the "U" shaped liner mounted on top of the trough of the conveyor.

In FIG. 1, a perspective view of the improved conveyor for handling free-flowing material is shown and designated by general reference numeral 10. The conveyor 10 includes an endless chain 12 having flights 14 mounted thereon. The chain 12 and flights 14 are received in a "U" shaped trough 16 having a roof cover 18 mounted over the open top of the trough 16. The conveyor 10 further includes an intake port 20. The discharge port for the conveyor 10 is at the far end of the trough 16 and is not shown in the drawings. The endless chain 12 is mounted on an idle sprocket 22 attached to an idle shaft 24. At the opposite end of the chain 12 is a drive sprocket which cannot be seen in the drawings mounted on a drive shaft 26. The drive shaft 26 is attached to a drive motor, which also is not shown in the drawings.

The improved conveyor 10 is adapted for receiving a "U" shaped liner 28 which is contoured to fit on top of the round bottom trough 16 with the sides of the liner 28 extending upwardly along the sides of the trough 16. Upper edges 30 of the liner 28 are attached to the sides of the trough 16 by attachment means which is discussed under the description of FIG. 4. In this view elongated seal retainers 32 can be seen extending along the length of the sides of the trough 16. The seal retainers are part of the attachment means for securing the liner 28 to the trough 16.

While the endless chain 12 and flights 14 are shown for handling free-flowing material in the trough 16, it should be appreciated that an auger type screw could also be used in place of the endless chain 12 and flights 14 for handling the free-flowing material and work equally well with the improved conveyor 10 as described herein.

In FIG. 2 a top view of the improved conveyor 10 is seen with the endless chain 12 and flights 14 removed. In this view the "U" shaped liner 28 can be seen with an aperture 34 in the center of the liner 28 having a bolt 36 extending through the aperture 34 and secured to the bottom of the trough 16. By having a single bolt 36 in the center of the liner 28, the liner 28 is free to expand and contract in all directions therefrom.

Also seen in this view is a partial view of an adjacent liner 28 disposed at one end of the liner 28 in the trough 16. It should be noted that a space 38 is provided between the ends of the two liners 28 so that room is provided to allow for expansion and contraction at the ends of the liners 28. An angular shaped bar 40 is attached to the bottom of the trough 16 and extends into a portion of the ends of the liners 28. This bar 40 may be made of metal or may be UHMW liner material. The bar 40 provides a bridge to prevent the flights 14 from dropping into the space 38 between the liners 28 as the flights 14 ride along the bottom of the trough 16.

In FIG. 3 a side sectional view of the conveyor 10 is taken along lines 3—3 shown in FIG. 2. In this view a plurality of apertures 42 can be seen in a spaced relationship to each other and along the length of the sides of the liner 28. The apertures 42 receive bolts 44 therethrough and through apertures in the sides of the trough 16. This attachment can be seen more clearly in FIG. 4. Also seen in FIG. 3 is the seal retainer 32 extending along the length of the trough 16 and having a plurality of apertures 46 therethrough. Shown in dotted lines behind the retainer 32 are angular shaped pressure blocks 48 which again can be seen more clearly in FIG. 4.

Figures 4, 5:
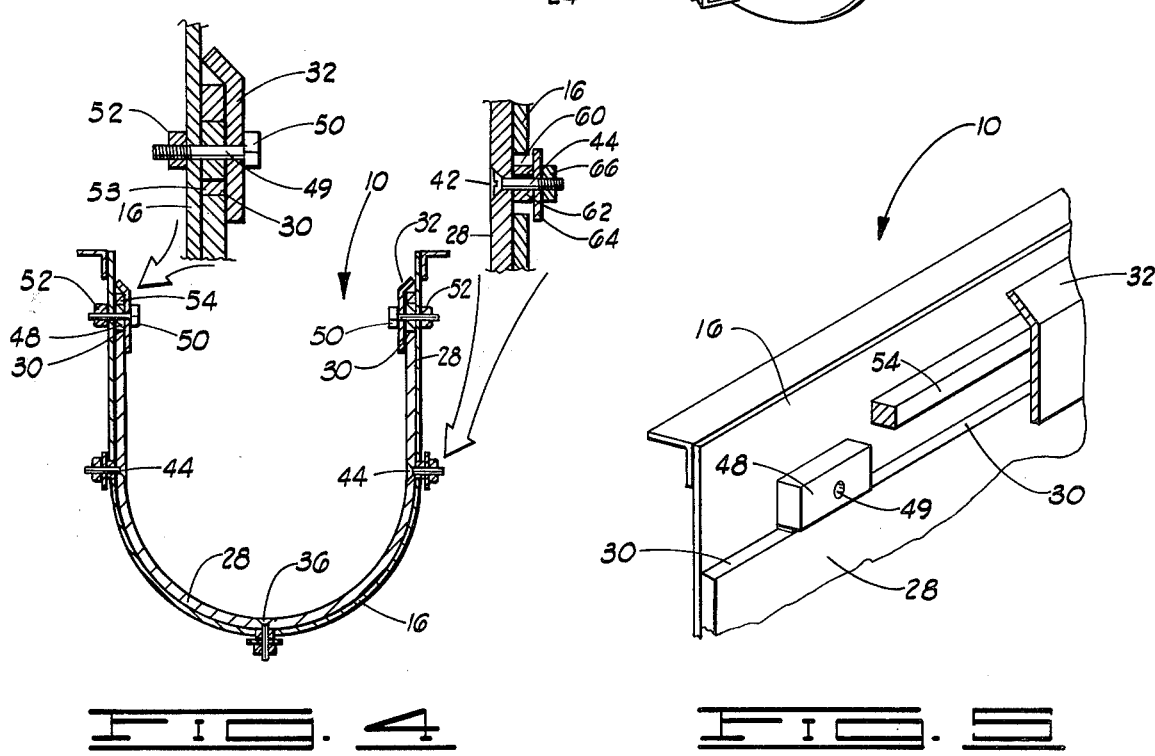
FIG. 4 is an end sectional view taken along lines 4—4 shown in FIG. 2.
FIG. 5 is a perspective view of a portion of the side of the conveyor trough illustrating a pressure block, and seal retainer for securing the liner on top of the round bottom trough.

In FIG. 4 a side sectional view of the conveyor 10 is seen taken along lines 4—4 in FIG. 2. The "U" shaped liner 28 can be seen more clearly received on top of the "U" shaped trough 16 and extending upwardly along both sides of the trough 16. The edges 30 of the liner 28 are received against pressure blocks 48. The pressure blocks 48 are made of a resilient rubber or the like and have an aperture 49 therethrough for receiving bolts 50. The bolts 50 are also received through apertures 46 in the seal retainer 32. The ends of the bolt 50 are attached to nuts 52. As the retainer plate 32 is tightened against the pressure blocks 48, the pressure blocks 48 are compressed and expand outwardly against the edges 30 of the liner 28, thereby rigidly securing the liner 28 against the sides and top of the round bottom of the "U" shaped trough 16. Also because the pressure blocks 48 are compressible as the liner 28 expands, the pressure blocks 48 are compressed by the edges 30 of the liner 28, thereby allowing the liner 28 to expand and contract against the pressure blocks 48 without causing the liner 28 to buckle or to become distorted on top of the trough 16.

While individual pressure blocks 48 are shown in the drawings, it should be appreciated that continuous resilient pressure blocks could be used equally well extending along the side of the trough 16. The continuous pressure block would serve the same function as the blocks 48 and also serve as a seal to prevent material from dropping between the sides of the trough 16 and the liner 28.

To prevent the edges 30 of the liner 28 from adhering to the pressure blocks 48, a small metal spacer 53 is provided therebetween. While the metal spacer 53 is preferable, it should be appreciated that the pressure block could be used equally well without it.

To prevent the free-flowing material handled by the conveyor 10 from dropping between the inside of the liner 28 and the sides of the trough 16, a soft sponge-like rubber seal 54 is provided along the length of the sides of the trough 16. The seal 54 is disposed above the top of the pressure blocks 48 and is held in place and compressed between the sides of the seal retainer 32 and the sides of the trough 16 when the retainer 32 is tightened against the sides of the trough 16 by the bolts 50.

The liner 28 is also held in place against the sides of the "U" shaped trough 16 by a plurality of the bolts 44 shown in FIG. 3. The bolts 44 are in a spaced relationship along the sides of the liner 28 and are received through the apertures 42 in the liner 28. It should be noted that the bolts 44 are free to move on the sides of the trough 16 by providing an aperture 60 which is greater than the diameter of the bolts 44. This can be seen in the enlarged view of the bolt 44 which has a spacer 62 along with a washer 64 and a nut 66 attached to the threaded portion of the bolt 44. The enlarged aperture 60 in the sides of the trough 16 allow movement in all directions of the bolt 44 so that as the ambient temperature changes and the liner 28 expands and contracts, the liner 28 can move on the top of the trough 16 without buckling or becoming distorted.

In FIG. 5 a perspective view of a portion of the side of the trough 16 can be seen. This view is shown to illustrate more clearly the pressure block 48 riding on top of the edge 30 of the liner 28 and the seal 54 extending along the length of the side of the trough 16 and disposed above the edge 30 of the liner 28. Also the seal retainer 32 can be seen in a cut-away section showing how it rides against the sides of the seal 54 and compresses the seal against the side of the trough 16 to prevent the free-flowing material in the conveyor 10 from dropping on top of the edge 30 of the liner 28 and becoming lodged between the inside of the liner 28 and the sides of the trough 16.

Changes may be made in the construction and arrangement of the parts or elements of the embodiments as described herein without departing from the spirit or scope of the invention defined in the following claims:

What is claimed is:

1. In a conveyor having a round bottom trough for receiving free-flowing material therein, the conveyor having an endless chain with flights thereon or a screw for moving the free-flowing material along the length of the trough, the improvement comprising:
   a plurality of "U" shaped liners contoured to fit on top of the round bottom trough, said liners placed end to end on top of the round bottom trough with sufficient space placed between the ends of said liners to allow for lengthwise expansion of said liners; and
   a plurality of resilient pressure blocks mounted along the sides of the trough in a spaced relationship to each other and butted against the edges of said liners, said pressure blocks having apertures for receiving bolts therethrough, said bolts received through apertures in the sides of the trough and attached thereto, said pressure blocks permitting said "U" shaped liners to expand and contract transverse to the length of said liners.

2. The improved conveyor as described in claim 1 further including seals extending along the sides of the round bottom trough and attached thereto, said seals disposed above said pressure blocks and along the edges of said liner for preventing the free-flowing material from falling between said liner and the sides of the trough.

3. The improved conveyor as described in claim 2 further including seal retainers extending along the length of the sides of the trough and attached to said pressure blocks, said seal retainers compressing said seals and said pressure blocks against the sides of the trough and holding said seals in place.

4. The improved conveyor as described in claim 3 further including a plurality of bolts received through apertures in the sides of said liner and in a spaced relationship along the length of said liner, said bolts also received in apertures in the sides of said trough, said apertures in the sides of said trough having a diameter greater than the diameter of the bolts so that the bolts may move therein when said liner expands and contracts on the round bottom trough.

5. The improved conveyor as described in claim 1 wherein said "U" shaped liner is made of UHMW polyethylene material.

6. In a conveyor having a round bottom trough for receiving free-flowing material therein, the conveyor having an endless chain with flights thereon or a screw for moving the free-flowing material along the length of the trough, the improvement comprising:

a plurality of "U" shaped liners contoured to fit on top of the round bottom trough, said liners placed end to end on top of the round bottom trough with sufficient space placed between the ends of said liners to allow for lengthwise expansion of said liners; and a continuous resilient pressure block mounted along the sides of the trough and butted against the edges of said liners, said pressure block having apertures for receiving bolts therethrough, said bolts received through apertures in the sides of the trough and attached thereto, said pressure block allowing said "U" shaped liners to expand and contract transverse to the length of said liners.

7. In a conveyor having a round bottom trough for receiving free-flowing material therein, the conveyor having an endless chain with flights thereon or a screw for moving free-flowing material along the length of the trough, the improvement comprising:

a "U" shaped liner contoured to fit on top of the round bottom trough with the sides of the liner extending upwardly along the sides of said trough and extending along the length of the trough;

a plurality of resilient pressure blocks mounted along the sides of the trough in a spaced relationship to each other and butted against the edges of said liner, said pressure blocks having apertures therethrough for receiving bolts, said bolts received through apertures in the sides of the trough and attached thereto, said pressure blocks allowing said "U" shaped liner to expand and contract transverse to the length of said liner seals extending along the sides of the round bottom trough and attached thereto, said seals disposed above said pressure blocks and along the edges of said liner for preventing the free-flowing material from falling between said liner and the sides of said trough; and seal retainers extending along the length of the sides of the trough and attached to said pressure blocks, said seal retainers compressing said seals and said pressure blocks against the sides of the trough and holding said seals in place.

* * * * *